(12) United States Patent
Wuensch et al.

(10) Patent No.: US 7,223,165 B2
(45) Date of Patent: May 29, 2007

(54) ABRASIVE PAD FOR A MANUAL GRINDING MACHINE

(75) Inventors: Steffen Wuensch, Holzgerlingen (DE); Joao Bergner, Aidlingen (DE)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 11/001,990

(22) Filed: Dec. 2, 2004

(65) Prior Publication Data

US 2005/0124275 A1    Jun. 9, 2005

(30) Foreign Application Priority Data

Dec. 6, 2003    (DE) ................ 103 57 144

(51) Int. Cl.
*B24D 17/00* (2006.01)
(52) U.S. Cl. ..................... 451/490; 451/538
(58) Field of Classification Search ............ 451/538, 451/340, 359, 360, 363, 490, 504, 508, 514
See application file for complete search history.

(56) References Cited

U.S. PATENT DOCUMENTS

| | | | |
|---|---|---|---|
| 5,018,314 A | 5/1991 | Fushiya et al. | |
| 5,201,149 A * | 4/1993 | Eisenblatter | 451/526 |
| 5,201,785 A * | 4/1993 | Nagano | 451/508 |
| 5,368,549 A | 11/1994 | McVicker | |
| 5,656,226 A | 8/1997 | McVicker | |
| RE37,338 E | 8/2001 | McVicker | |
| 6,394,887 B1 * | 5/2002 | Edinger | 451/494 |
| 6,530,828 B1 * | 3/2003 | Kolthoff | 451/490 |
| 7,033,262 B2 * | 4/2006 | Takizawa et al. | 451/490 |
| 2005/0124275 A1 * | 6/2005 | Wuensch et al. | 451/538 |

FOREIGN PATENT DOCUMENTS

| | | |
|---|---|---|
| EP | 0 095 015 A1 | 11/1983 |
| EP | 0 557 773 A1 | 9/1993 |
| EP | 1 452 271 | 9/2004 |
| GB | 2 323 891 A | 10/1996 |
| GB | 2 390 560 A | 1/2004 |

* cited by examiner

*Primary Examiner*—Jacob K. Ackun, Jr.
(74) *Attorney, Agent, or Firm*—Michael J. Striker

(57) ABSTRACT

An abrasive pad for a manual grinding machine, in particular for an eccentric grinder, has a flat contact surface (13) on which an abrasive sheet is placed, and attachment means located on the contact surface (13) for creating an adhesive connection with the abrasive sheet. To reduce the production costs of the abrasive pad, it is made entirely—including the attachment means—of plastic using a single-component injection molding procedure, whereby the attachment means are designed preferably as hook-type fasteners (18) which extend out of the contact surface (13) (FIG. 1).

8 Claims, 3 Drawing Sheets

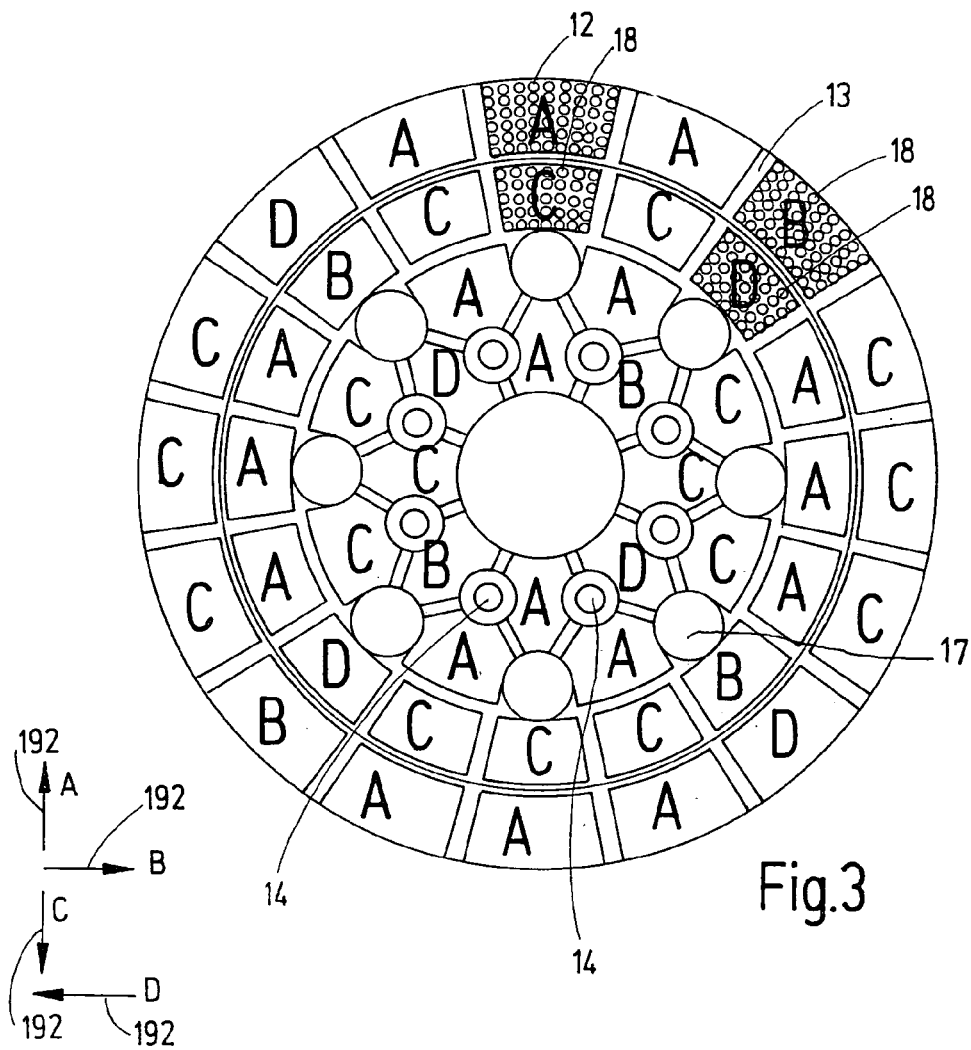
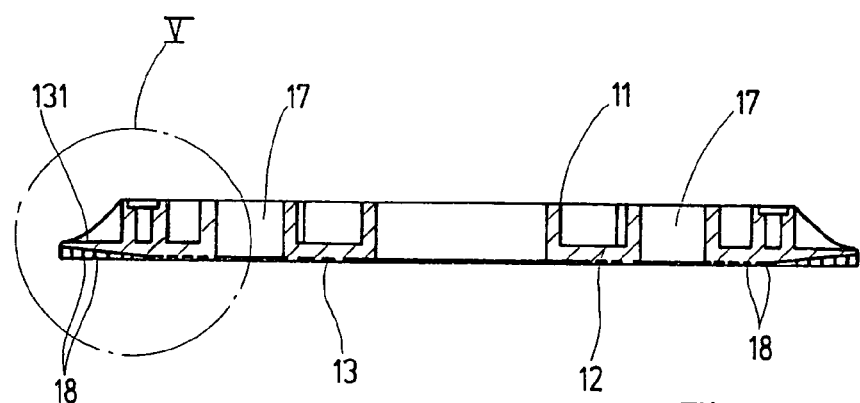

ABRASIVE PAD FOR A MANUAL GRINDING MACHINE

CROSS-REFERENCE

The invention described and claimed hereinbelow is also described in DE 10357144.2, filed Dec. 6, 2003. This German Patent Application, whose subject matter is incorporated here by reference, provides the basis for a claim of priority of invention under 35 U.S.C. 119 (a)–(d).

BACKGROUND OF THE INVENTION

The present invention is directed to an abrasive pad for a manual grinding machine, in particular for an eccentric grinder.

A known manual grinding machine designed as an eccentric grinder (U.S. Pat. No. 5,018,314) includes an abrasive pad which is mounted via a pivot bearing on an electric motor-driven eccentric driven shaft of an eccentric drive. The pad body of the abrasive pad is composed of a bearing receiving part and a grinding means carrier mounted thereto composed of an elastically deformable material which has a flat, circular contact surface for an abrasive pad opposite the bearing receiving part. The bearing receiving part is composed of a flat, round plate and a bearing support which is integral with the plate and extends out of the plate at a right angle, the pivot bearing being inserted in the bearing support. The grinding means carrier lies flat on the plate and grips over it in the manner of a clip with its edge which is configured accordingly.

With a known abrasive pad for a manual grinding machine (EP 0 557 773 B1), the pad body is composed of a support plate made of plastic, a cushion applied via foaming to the support plate as a carrier for grinding means, and a steel disk as reinforcing member located between the support plate and cushion. The underside of the cushion forms a flat contact surface for an abrasive sheet and is covered with a gripping fabric to which the velour backing of the abrasive sheet attaches. In terms of manufacturing abrasive pads of this nature, it is known to manually place the support plate with steel disk and the coarsely precut gripping fabric in a foaming mold and to join these components with the foamed cushion by filling the foaming mold with foam. After the finished abrasive pad is removed from the foaming mold, the gripping fabric hanging over the outer edge of the contact surface is trimmed off. This manufacturing process requires manual labor to insert the pad body and the coarsely precut gripping fabric in the foaming mold and, due to the relatively slow-acting foaming process, it also requires a very long cycle time.

SUMMARY OF THE INVENTION

The abrasive pad according to the present invention for a manual grinding machine has the advantage that, due to the production, according to the present invention, of all aforementioned components of the known abrasive pad out of just one injectable plastic component, special manual steps are eliminated and the manufacturing process is shortened by a very great extent, since the injection-molding process lasts for a fraction as long as the foaming process. The complete abrasive pad, including the attachment means for holding the abrasive sheet, are manufactured out of the same plastic in a single working step in a very short manufacturing time, which greatly reduces the production costs for the abrasive pad, which is a mass-produced article. By shaping the pad body accordingly, the abrasive pad is designed such that it has a minimal weight and resists the forces which occur during no-load operation and grinding operation. Attention is also given to the fact that the edges of the pad body can withstand the loads incurred while sanding edges.

The abrasive pad according to the present invention has the advantage that manufacturing the region of the supporting structure in the abrasive pad out of a substantially harder plastic results in a more stable abrasive pad holder for attachment to the manual grinding machine, while the region of the plate which is injection-molded to the supporting structure with receiving surface and gripping cover is softer in design and, as a result, can be adapted very well to the required grinding properties of the abrasive pad. The advantages of the abrasive pad mentioned hereinabove with regard for single-component manufacture compared to the known abrasive pads are also achieved here.

According to an advantageous embodiment of the present invention, a plastic having high temperature stability is used as the material for the abrasive pad. This prevents the attachment means from losing a portion of their functionality at the high temperatures which occur during sanding, which would mean the abrasive sheets would no longer be securely attached. Different plastics, such as polyamide, may be used as the material.

According to an advantageous embodiment of the present invention, through holes are formed in the pad body during the injection-molding procedure, the holes being located preferably equidistantly on a graduated circle. These through holes serve to guide fastening screws, which are screwed into a bearing flange of the drive unit of the manual grinding machine and/or serve to receive antitorsion pins located on the bearing flange.

According to a preferred embodiment of the present invention, the attachment means include hook-type fasteners which extend out of the contact surface, whereby the hook-type fasteners include a tab extending out of the contact surface as an integral piece and at least one hook on one free end of the tab which is bent in a defined direction. The hook-type fasteners are positioned in groups in which the hooks have the same orientation, but each group has a different orientation of their hooks, and the groups of hook-type fasteners are preferably evenly distributed over the contact surface. This special arrangement of the hook-type fasteners results in a substantially improved attachment of the abrasive sheets against the shear forces which occur during sanding, whereby rotational forces are involved with an eccentric grinder. While there is only one main direction with the known abrasive pads covered with conventional gripping fabric, in which the gripping fabric/velour connection provides the best hold, the arrangement and orientation of the hook-type fasteners according to the present invention results in the shear forces being absorbed nearly evenly. This results in a substantially increased resistance to the motion of the abrasive sheet relative to the contact surface.

These advantages are achieved, according to an advantageous embodiment of the present invention, when a total of four groups of hook-type fasteners is provided, wherein the hook orientation is the same in each group, and the groups of hook-type fasteners are distributed over the contact surface such that the hook directions in the groups of hook-type fasteners are rotated by 90° relative to each other. Each group of hook-type fasteners is preferably provided multiple times in various sections of the contact surface.

According to a preferred embodiment of the present invention, the axial height of the hook-type fastener is adjusted for a desired grinding behavior of the pad body on which the abrasive sheet is placed. The height of the hook-type fasteners is adjusted empirically, i.e., via testing, such that the hook-type fasteners have a certain degree of softness in order to follow slightly curved sanding surfaces, while the hook-type fasteners are configured hard enough, however, that an adequately large amount of shearing force is transmitted during sanding.

According to an advantageous embodiment of the present invention, the hook-type fasteners located in a circumferential edge zone of the contact surface have a greater axial height than the remaining hook-type fasteners on the contact surface. Due to this configuration of the hook-type fasteners, the requirement for a resilient edge zone of the abrasive pad—which contributes to good grinding behavior—is fulfilled, in particular. Advantageously, the height of the hook-type fasteners in the edge zone decreases from the outer zone line toward the inner zone line, whereby the decrease can be continuous or stepwise. The continuous decrease can be linear or it can follow a selected curve trace.

According to an advantageous embodiment of the present invention, the number of hook-type fasteners increases from the inner zone line to the outer zone line of the edge zone of the contact surface. The increase can be continuous or non-continuous. The advantage of this is that the hook-type fastening is adjusted for the higher external forces. The ratio of the number of hook-type fasteners in the edge zone to the height of the hook-type fasteners is always designed such that, in terms of very good grinding behavior, the edge zone is always more resilient than the rest of the contact surface.

BRIEF DESCRIPTION OF THE DRAWINGS

FIG. 3 shows a bottom view of the abrasive pad in FIG. 2, FIG. 4 shows a sectional drawing along the line IV—IV in FIG. 2.

DESCRIPTION OF THE PREFERRED EMBODIMENTS

Figure 1:
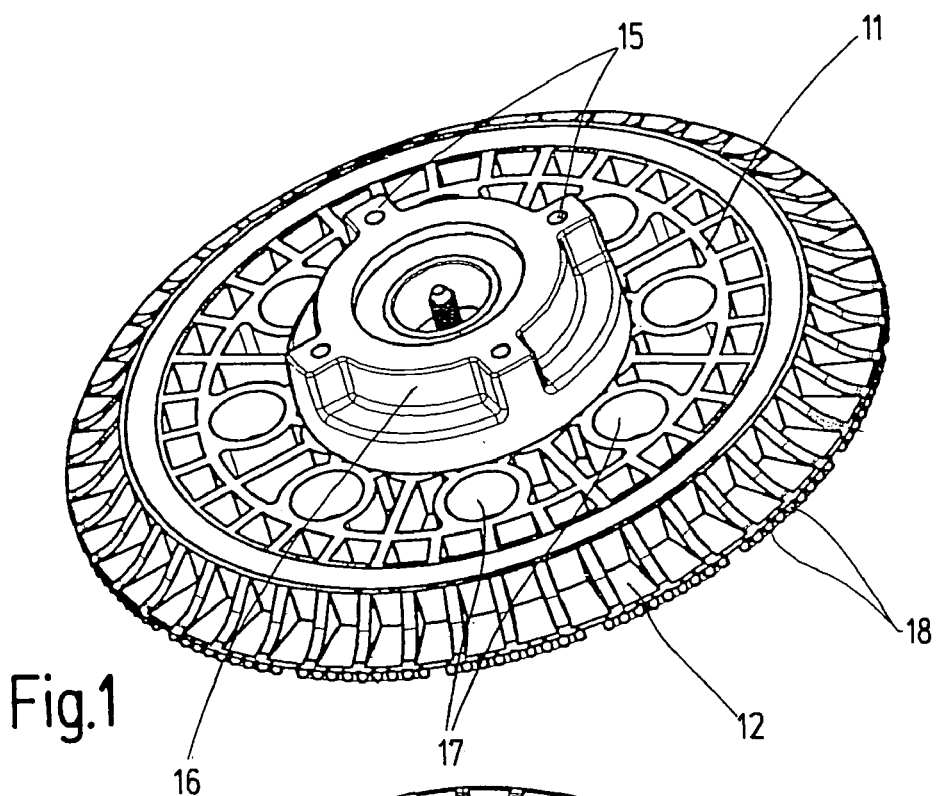
FIG. 1 shows a perspective illustration of an abrasive pad fastened to a bearing flange of an eccentric grinder.
Figure 2:
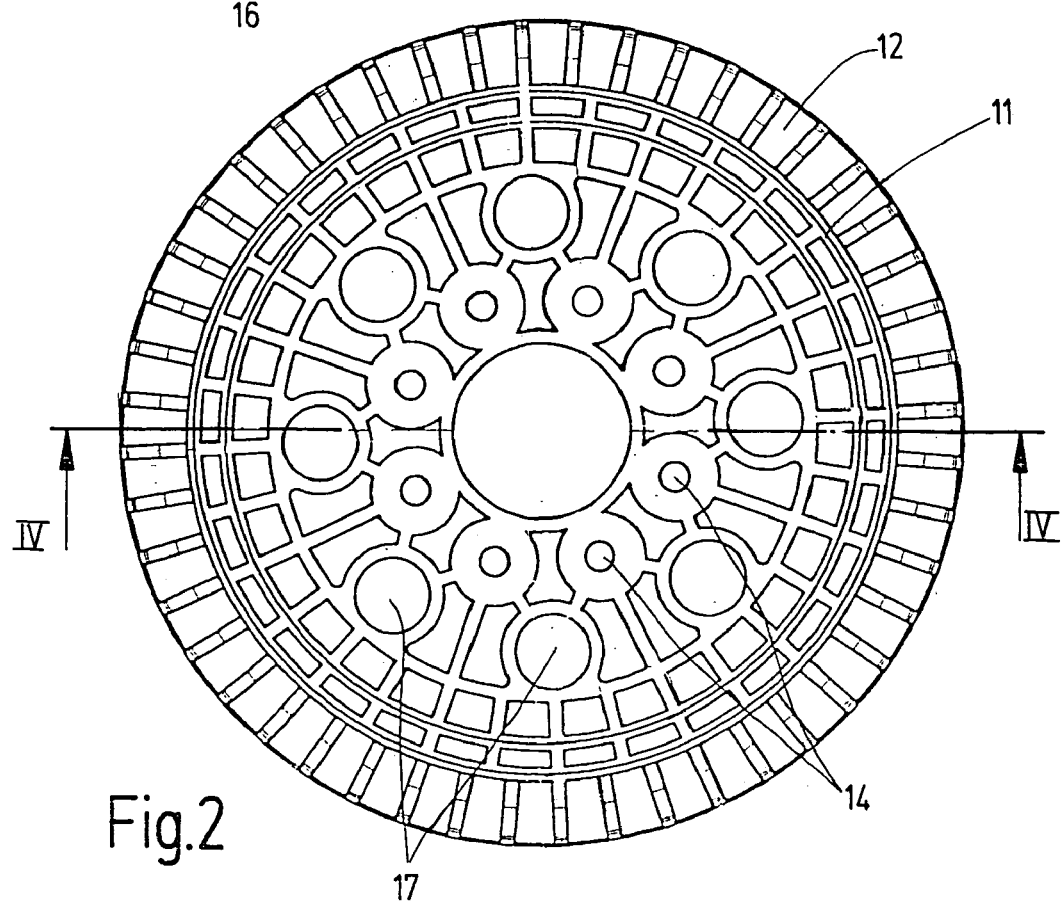
FIG. 2 shows a top view of the abrasive pad in FIG. 1.

The abrasive pad for an eccentric grinder shown in a perspective depiction in FIG. 1, a top view in FIG. 2, and a bottom view in FIG. 3 as an exemplary embodiment for a manual grinding machine has a pad body 10, which has a supporting structure 11 formed of ribs, and a flat plate 12 integrally molded on its underside. The underside of plate 12 opposite supporting structure 11 is designed as a flat contact surface 13 for an abrasive sheet, which is not shown here. Pad body 10 is designed such that a minimum weight is achieved while resisting the forces occurring during no-load operation and grinding operation. Through holes 14 having graduated diameters are formed in pad body 10, the hole section having the larger diameter penetrating plate 12. The eight, in total, graduated through holes 14 in the exemplary embodiment are located on an inner graduated circle. Four of the eight through holes 14 in all serve as guides for fastening screws which are screwed into threaded holes 15 of a bearing flange 16 of a drive unit of the eccentric grinder, whereby the screw head of the fastening screw can pass through the hole section of through hole 14 having the larger diameter. The remaining through holes 14 are designed to receive centering pins. Suction holes 17 are provided on a concentric outer graduated circle having a larger diameter than the inner graduated circle, the suction holes also penetrating plate 12 and serving to suction away grinding dust produced during grinding.

Figure 9:
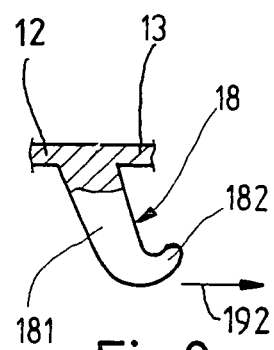
FIG. 9 shows an enlarged side view of a hook-type fastener of the abrasive pad.

Attachment means are provided on contact surface 13 which serve to produce an adhesive connection with a disk-shaped abrasive pad, which is not shown here. In the exemplary embodiment, the attachment means are configured as hook-type fasteners 18, which are designed integral with plate 12 and extend axially out of contact surface 13. An exemplary embodiment of a hook-type fastener 18 is shown in FIG. 9. Hook-type fastener 18 has a tab 181 which is integral with plate 12 and a hook 182 on the free end of tab 181 which is bent in a defined direction. In an alternative embodiment, tab 181 can also be provided with two hooks 18 which are bent away from tab 181 in opposite directions. In the latter case, tab 181 is tilted relative to plate 12, as shown in FIG. 9, but rather extends out of plate 12 at a right angle. The direction in which hook 182 of hook-type fastener 18 points is labelled with arrow 192 in FIG. 9. Hook-type fasteners 18 are arranged on contact surface 13 in groups with their hooks 182 having the same orientation, whereby orientation 19 of hook 182 differs from group to group. The groups of hook-type fasteners are distributed over contact surface 13, whereby the distribution is preferably even.

As illustrated in FIG. 3 using symbols A, B, C and D, a total of four groups of hook-type fasteners, each having the same orientation 192 of hook 182 within the group are provided on contact surface 13 in the exemplary embodiment of the abrasive pad described. Groups of hook-type fasteners A, B, C and D are arranged distributed over contact surface 13 such that the overall orientation 19 of all hooks 182 of the groups of hook-type fasteners is rotated by 90° relative to each other, that is, A is rotated by 90° relative to B, B is rotated by 90° relative to C, C is rotated by 90° relative to D, and D is rotated by 90° relative to A. The orientation of hook-type fasteners 18 in the groups of hook-type fasteners A, B, C and D is indicated by arrows 192 located next to each symbol. Referring to FIG. 3, all hooks 182 in group A of hook-type fasteners in the drawing point upward, all hooks 182 in group B of hook-type fasteners point to the right, all hooks 182 in group C of hook-type fasteners point downward, and all hooks 182 in group C of hook-type fasteners point to the left. As shown in FIG. 3, each of the groups A, B, C and D of hook-type fasteners is provided multiple times on contact surface 13. The distribution and orientation of the groups of hook-type fasteners shown in FIG. 3 are examples only. The number of groups of hook-type fasteners and their orientation can vary in any manner. Each group of hook-type fasteners has a main direction in which the adhesive connection with the back of the sanding pad covered with velour provides the best hold. Due to the large number of groups of hook-type fasteners having different orientations of their main direction, a nearly even distribution of the absorption of shear forces by hook-type fasteners 18 over the entire contact surface 13 is achieved.

Figure 5:
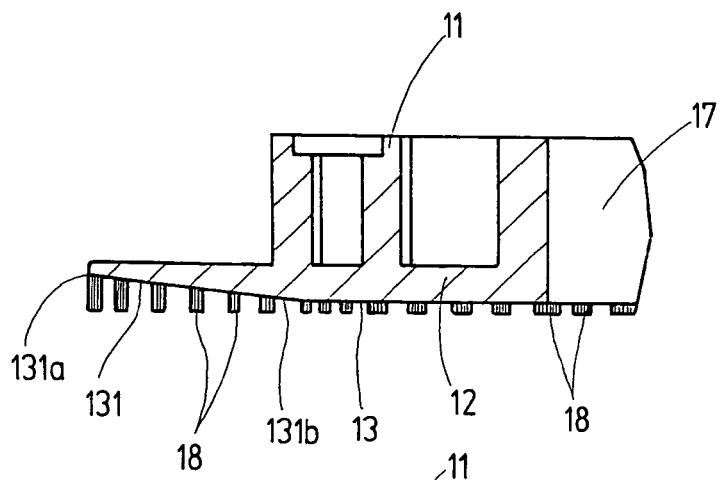
FIG. 5 shows an enlarged depiction of section V in FIG. 4, FIGS. 6–8 each show the same depiction as in FIG. 5, with different configurations of the hook-type fasteners in the edge region of the abrasive pad.
Figure 6:
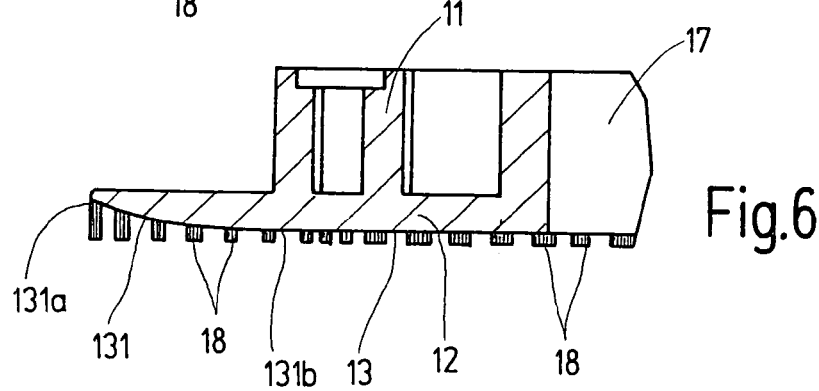
Figure 7:
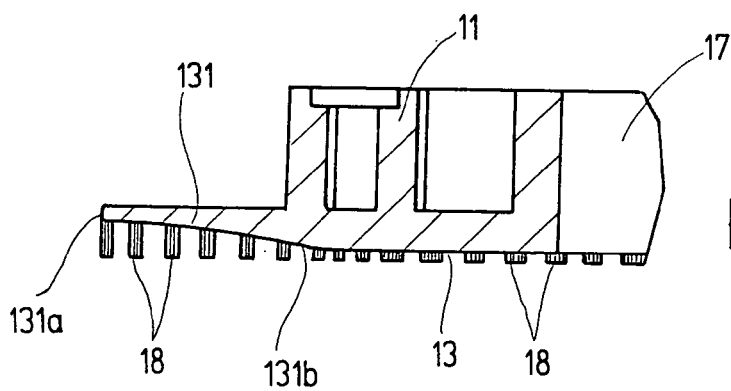
Figure 8:
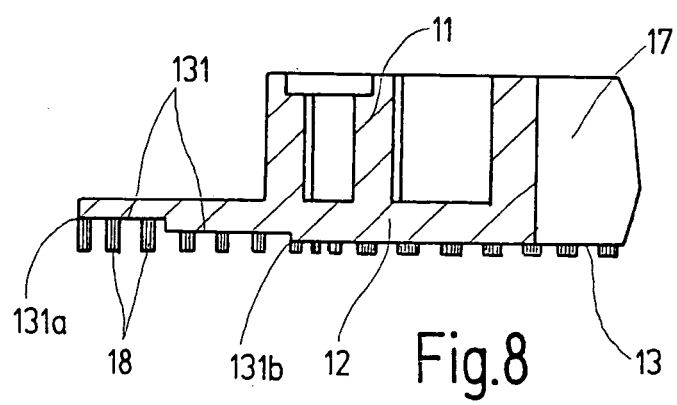

To achieve good sanding behavior of the abrasive pad, the height of hook-type fasteners 18 is adjusted via testing such that satisfactory sanding behavior is achieved. This sanding behavior is defined by stating that the abrasive pad must have a certain degree of softness to easily follow curved sanding surfaces, and hook-type fasteners 18 must not be designed too soft, or the transfer of shear forces will be minimized, which results in a reduced sanding effect accompanied by an increased load on the hooks. In addition, a resilient edge zone of the abrasive pad is required for the sanding behavior. The latter is achieved by providing the hook-type fasteners 18 in the outer, circumferential edge zone 131 of contact surface 13 with a height which is higher as viewed in the axial direction than the hook-type fasteners 18 on the rest of contact surface 13. As shown in the sectional drawing in FIG. 4 and in the enlarged view in FIG. 5, the height of hook-type fasteners 18 in edge zone 131 decreases from outer zone line 131a toward inner zone line 131b. In the exemplary embodiment in FIG. 5, this reduction in hook height is continuous and linear. To this end, due to a tapering of plate 12 toward the outside, contact surface 13 extends inward at a slant in the region of edge zone 131, so that its distance from a plane extending past the free ends of hook-type fasteners 18—the plane extending parallel to contact surface 13—increases from inner zone line 131b toward outer zone line 131a. In the two exemplary embodiments shown in FIGS. 6 and 7, the reduction in hook height is also continuous, although it follows a predetermined curve. This is realized by the fact that contact surface 13 on plate 12 extends inwardly within edge zone 131 and is curved from inner zone line 131b toward outer zone line 131a; in fact, it is convex in FIG. 6 and concave in FIG. 7. In the exemplary embodiment in FIG. 8, the height of hook-type fasteners 18 within edge zone 131 decreases discretely from the outside to the inside. To this end, edge zone 131 of contact surface 13 is graduated, e.g., in two sections, which have a different distance from contact surface 13.

To adjust the hook-type attachment to the outwardly effective higher forces, the number of hook-type fasteners 18 can increase continuously or non-continuously from inner zone line 131b toward outer zone line 131a. The ratio of the number of hook-type fasteners 18 to the height of hook-type fasteners 18 is always designed such that edge zone 131 is always more resilient, in terms of stiffness, than the remaining area of contact surface 13.

Pad body 10 with supporting structure 11 and plate 12, and hook-type fasteners 18 are integral in design and are made of only one plastic component in a single-component injection molding procedure. Various plastics which have high temperature resistance, such as polyamide, can be used.

As an alternative, pad body 10 is formed via injection molding out of two plastic components having different hardnesses in a 2-component procedure. Plate 12 with hook-type fasteners 18 integrally molded thereon is made of a softer plastic, and supporting structure 11 which carries plate 12 is made of a relatively harder plastic. As a result, plate 12 with hook-type fasteners 18 can be adjusted very well, in terms of their resilience, to the required grinding behavior of the abrasive pad, while the stiffer supporting structure 11 forms a more stable mounting part for plate 12 and for attachment to the drive of the manual grinding machine.

The present invention is not limited to the exemplary embodiment described. For example, instead of being attached to the drive unit of the eccentric grinding using fastening screws inserted through through holes 14, the abrasive pad can also be attached using just one central screw, as depicted in EP 0 557 773 B1, for example.

The abrasive pad described above is preferably suited for eccentric grinders. It can also be used as an abrasive pad or abrasive plate on oscillating sanders and linear sanders and, to this end, it is designed with a rectangular or delta-shaped contour.

The invention claimed is:

1. An abrasive pad for a manual grinding machine, comprising:
    a pad body (13) made of plastic, wherein said pad body (13) has a flat contact surface (13) on which an abrasive sheet is placed; and
    hook-type fasteners extending from the contact surface (13) for creating an adhesive connection with the abrasive sheet,
    wherein the hook-like fasteners and contact surface are configured as one piece;
    wherein the hook-type fasteners (18) located in a circumferential edge zone (131) of the contact surface (13) have a greater axial height than the remaining hook-type fasteners (18) on the contact surface (13); and
    wherein the height of the hook-type fasteners (18) in the edge zone (131) decreases from its outer zone lines (131a) toward the inner zone line (131b).

2. The abrasive pad as recited in claim 1, wherein the hook-type fasteners (18) include a tab (181) extending out of the contact surface (13) and at least one hook (182) on one free end of the tab (181) which is bent in a defined direction (19), and
    wherein hook-type fasteners (18) are positioned in groups in which the hooks have the same orientation, but the orientation of the hooks (182) differs from group to group, and the groups of hook-type fasteners are distributed preferably evenly over the contact surface (13).

3. The abrasive pad as recited in claim 2, wherein a total of four groups of hook-type fasteners (A, B, C, D), each having the same hook orientation, is provided, and
    wherein the groups of hook-type fasteners (A, B, C, D) distributed over the contact surface (13) are arranged such that the hook orientations in the four groups of hook-type fasteners (A, B, C, D) are each rotated by 90° relative to each other.

4. The abrasive pad as recited in claim 3, wherein each group of hook-type fasteners is provided multiple times on the contact surface (13).

5. The abrasive pad as recited in claim 1, wherein the decrease in the height of the hook-type fasteners (18) is continuous or non-continuous.

6. The abrasive pad as recited in claim 1, wherein the number of hook-type fasteners (18) increases in a continuous or non-continuous manner from the inner zone line (131b) toward the outer zone line (131a) of the edge zone (131) of the contact surface.

7. The abrasive pad as recited in claim 6, wherein the ratio of the number of hook-type fasteners (18) to their height within the edge zone (131) is designed such that, in terms of the grinding behavior, the edge zone (131) is less stiff than the rest of the contact surface (13).

8. The abrasive pad as recited in claim 1, wherein the contact surface (13) is formed on a plate (12), wherein the plate (12) is injected on a support structure (11) of the pad body (10) in a two-component injection process, wherein the support structure is made of a harder plastic component than the plate.

* * * * *